(12) United States Patent
Lett et al.

(10) Patent No.: US 12,307,409 B2
(45) Date of Patent: May 20, 2025

(54) TRACTOR-TRAILER ID METHODS AND SYSTEM

(71) Applicant: AMETEK, INC., Berwyn, PA (US)

(72) Inventors: David B. Lett, Berwyn, PA (US); Uday Shankar, Berwyn, PA (US); Michael Schork, Berwyn, PA (US); Michael T. Harvey, Berwyn, PA (US); Darrell Parks, Berwyn, PA (US)

(73) Assignee: AMETEK, INC., Berwyn, PA (US)

( * ) Notice: Subject to any disclaimer, the term of this patent is extended or adjusted under 35 U.S.C. 154(b) by 0 days.

(21) Appl. No.: 18/288,421

(22) PCT Filed: Apr. 22, 2022

(86) PCT No.: PCT/US2022/025900
§ 371 (c)(1),
(2) Date: Oct. 26, 2023

(87) PCT Pub. No.: WO2022/231962
PCT Pub. Date: Nov. 3, 2022

(65) Prior Publication Data
US 2024/0211852 A1  Jun. 27, 2024

Related U.S. Application Data

(60) Provisional application No. 63/182,233, filed on Apr. 30, 2021.

(51) Int. Cl.
*G06Q 10/0833* (2023.01)
*H04W 4/35* (2018.01)
*H04W 4/40* (2018.01)

(52) U.S. Cl.
CPC .......... *G06Q 10/0833* (2013.01); *H04W 4/35* (2018.02); *H04W 4/40* (2018.02)

(58) Field of Classification Search
CPC ....... G06Q 10/0833; H04W 4/35; H04W 4/40
See application file for complete search history.

(56) References Cited

U.S. PATENT DOCUMENTS 7,619,506 B2   11/2009  Knoll et al.
2003/0233189 A1  12/2003  Hsiao et al.
(Continued)

FOREIGN PATENT DOCUMENTS

KR       20080044305 A      5/2008

OTHER PUBLICATIONS

Morgan, J., Linger, K., Shaw, J., & Hinton, C. (2017). Tracking trailers: The latest in Trailer Telematics. Fleet Equipment Magazine. https://www.fleetequipmentmag.com/tracking-trailer-telematics/ (Year: 2017).*

(Continued)

*Primary Examiner* — Shannon S Campbell
*Assistant Examiner* — Manal A. Alsamiri
(74) *Attorney, Agent, or Firm* — Buchanan Ingersoll & Rooney PC

(57) ABSTRACT

A tractor-trailer ID system comprising a tractor device in a tractor, the tractor device including a tractor transceiver, a tractor display, and a tractor controller. The system also including a trailer device in the trailer, the trailer device including a trailer transceiver, and a trailer controller. The tractor-trailer ID system is configured to display, via the tractor display, load pickup instructions to a driver of the tractor, determine that the trailer has been connected to the tractor, and after determining that the trailer is connected to the tractor, transmit, from the trailer transceiver to the tractor transceiver, a trailer ID, confirm, via the tractor controller, the trailer ID.

17 Claims, 5 Drawing Sheets

(56) References Cited

U.S. PATENT DOCUMENTS

| | | | | |
|---|---|---|---|---|
| 2006/0261935 | A1* | 11/2006 | McAden | B60R 25/00 |
| | | | | 340/431 |
| 2009/0045924 | A1* | 2/2009 | Roberts, Sr. | G08G 1/20 |
| | | | | 340/10.41 |
| 2011/0267183 | A1* | 11/2011 | McKethan | G08B 13/1427 |
| | | | | 340/431 |
| 2016/0101811 | A1* | 4/2016 | Kyrtsos | B62D 15/0285 |
| | | | | 701/25 |
| 2018/0284781 | A1* | 10/2018 | Cohen | G05D 1/0225 |
| 2020/0184412 | A1* | 6/2020 | Champa | H04W 4/40 |
| 2020/0264607 | A1* | 8/2020 | Smith | B60R 1/003 |

OTHER PUBLICATIONS

International Search Report and Written Opinion for International Application No. PCT/US2022/025900, dated Aug. 5, 2022, 7 pages.

\* cited by examiner

TRACTOR-TRAILER ID METHODS AND SYSTEM

CROSS-REFERENCE TO RELATED APPLICATIONS

This Application is a U.S. National Phase Patent Application of PCT Patent Application No. PCT/US2022/025900, filed Apr. 22, 2022, which claims the benefit of priority of U.S. Provisional Application No. 63/182,233, entitled TRACTOR TRAILER ID METHODS AND SYSTEM, filed on 30 Apr. 2021, the contents of each of which are incorporated herein by reference in their entirety for all purposes.

FIELD

This disclosure relates generally to tractor-trailer ID methods and systems.

BACKGROUND

Truck drivers are typically responsible for picking up a trailer from a shipping yard. In a first example, picking up the trailer entails that the truck driver pick up an identified trailer that is assigned to the truck driver by a customer (e.g. shipper). In a second example, picking up the trailer entails that the truck driver pick up a trailer of their choosing in the ship yard and then report the identity of the picked up trailer to the customer (e.g. shipper). In the first example, an error may occur when the truck driver picks up the wrong trailer (e.g. picks up a trailer that was not assigned). In the second example, an error may occur when the driver reports the incorrect trailer identity to the customer (e.g. shipper) (e.g. driver picks up trailer A, but incorrectly reports that trailer B was picked up). These errors result great loss of productivity and customer service issues.

BRIEF DESCRIPTION OF THE DRAWINGS

The drawing figures depict one or more implementations in accord with the present teachings, by way of example only, not by way of limitation. In the figures, like reference numerals refer to the same or similar elements.

SUMMARY

Figure 1:
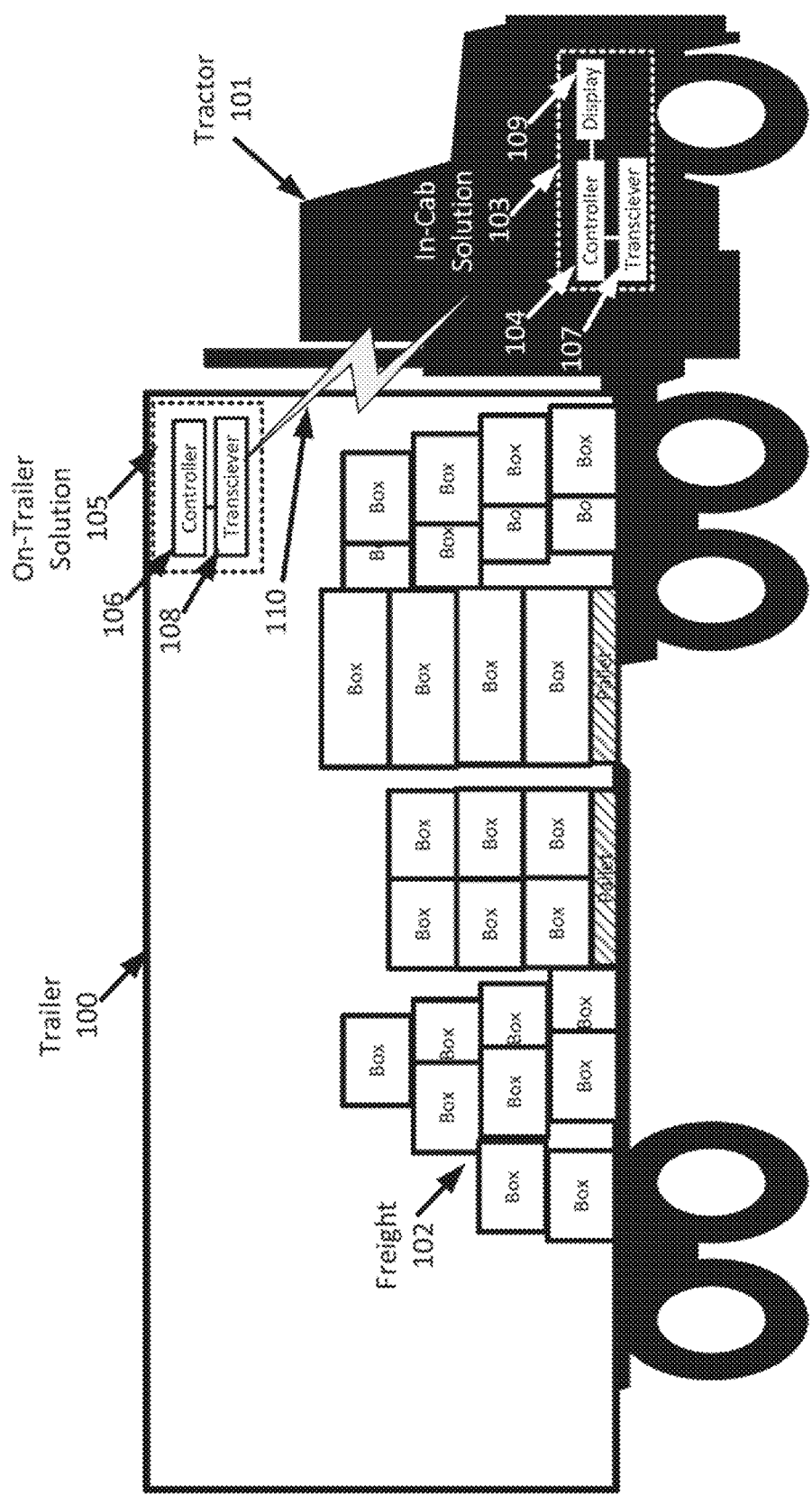
FIG. 1 shows a side view of a trailer loaded with freight and including a controller and transceiver in both the trailer and the tractor cab, according to an aspect of the disclosure.

A tractor-trailer ID system comprising: a tractor device in a tractor, the tractor device including a tractor transceiver, a tractor display, and a tractor controller. The system also including a trailer device in the trailer, the trailer device including a trailer transceiver, and a trailer controller. The tractor-trailer ID system is configured to display, via the tractor display, load pickup instructions to a driver of the tractor, determine that the trailer has been connected to the tractor, and after determining that the trailer is connected to the tractor, transmit, from the trailer transceiver to the tractor transceiver, a trailer ID, confirm, via the tractor controller, the trailer ID.

An asset ID system comprising a transportation device attached to a transportation means, the transportation device including a transportation transceiver, a transportation display, and a transportation controller. The system also including an asset device attached to an asset. The asset device including an asset transceiver, and an asset controller. The asset ID system is configured to display, via the transportation display, load pickup instructions to loading personnel of the transportation means, after the asset is loaded on or connected to the transportation means, transmit, from the asset transceiver to the transportation transceiver, an asset ID, and confirm, via the transportation controller, the asset ID.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description provides a practical and reliable solution to prevent problems resulting from drivers pulling the wrong trailer or entering the wrong trailer number in their workflow applications that result in great loss of productivity and customer service issues. The definition of the wrong trailer being a physical trailer that is different from the trailer the driver was either assigned by the customer (e.g. shipper) to the truck driver, or a physical trailer that is different from the trailer that the truck driver reported to the customer (e.g. shipper) as being picked up.

An objective of an effective solution is to provide a reliable and timely check that alerts drivers when pulling a wrong trailer or when they have entered a trailer number that does not match the physical trailer they are pulling before they have left a facility or within a very short time window after leaving the facility. The ideal solution is a virtual solution that does not require additional hardware other than the hardware already deployed on either the tractor or trailer.

This solution is referred to herein as a "virtual trailer ID solution" (VTID). In general, the VTID determines the specific trailer that is physically hooked to the tractor, works reliably in noisy communication and high traffic locations, is reliable and scalable, is available on common platforms (e.g. Android and IOS), and provides a tool required for in-cab solutions to eliminate the dependency on the driver to enter a trailer number or verify the number entered matches the actual trailer hooked and verify trailer number prior to the driver leaving the facility (within a few minutes).

The VTID also includes on-trailer solution 105 firmware to trigger broadcasting of the trailer ID for a period of time. In one example, the start of trailer motion may trigger transmissions of the trailer ID on broadcasting packets (e.g. Bluetooth advertising packets). In-Cab solution 103 starts scanning for the Bluetooth signal from nearby on-trailer solutions that are transmitting the trailer ID broadcasting packets. Upon reception, in-Cab solution 103 processes the trailer ID(s) provided by the application programing interface (API) to validate and match to the expected trailer ID. Appropriate action is taken if there is mismatch (e.g. generate alerts and notifications as required).

FIG. 1 shows an example of container 100 (e.g., trailer) loaded with freight 102 (e.g., boxes, pallets, etc.). Trailer 100 includes an on-trailer solution 105 having a controller (e.g. CPU, etc.) 106 and a wireless transceiver 108 (e.g. Bluetooth, WiFi, Cellular, GPS, etc.). Although not shown, in one example, on-trailer solution 105 may be powered by a power source of the trailer (e.g., connected to the container electrical wiring). In another example, the on-trailer solution 105 may be self-powered (e.g. battery powered, solar powered, etc.).

Tractor 101 includes an in-cab solution 103 having a controller (e.g. CPU, etc.) 104, a wireless transceiver 107 (e.g. Bluetooth, WiFi, Cellular, etc.) and display/input device 109 (e.g. Touch Screen, etc.) for outputting information to the driver and receiving information from the driver. In one example, in-cab solution 103 may be built into the tractor 101 as an infotainment system that is powered by a power source of the tractor. In another example, in-cab solution 103 may be a smart device (e.g. smartphone, etc.) in the possession of the driver. In either example, in-cab solution 103 would execute a software application that facilitates the tractor-trailer ID method.

Figure 2:
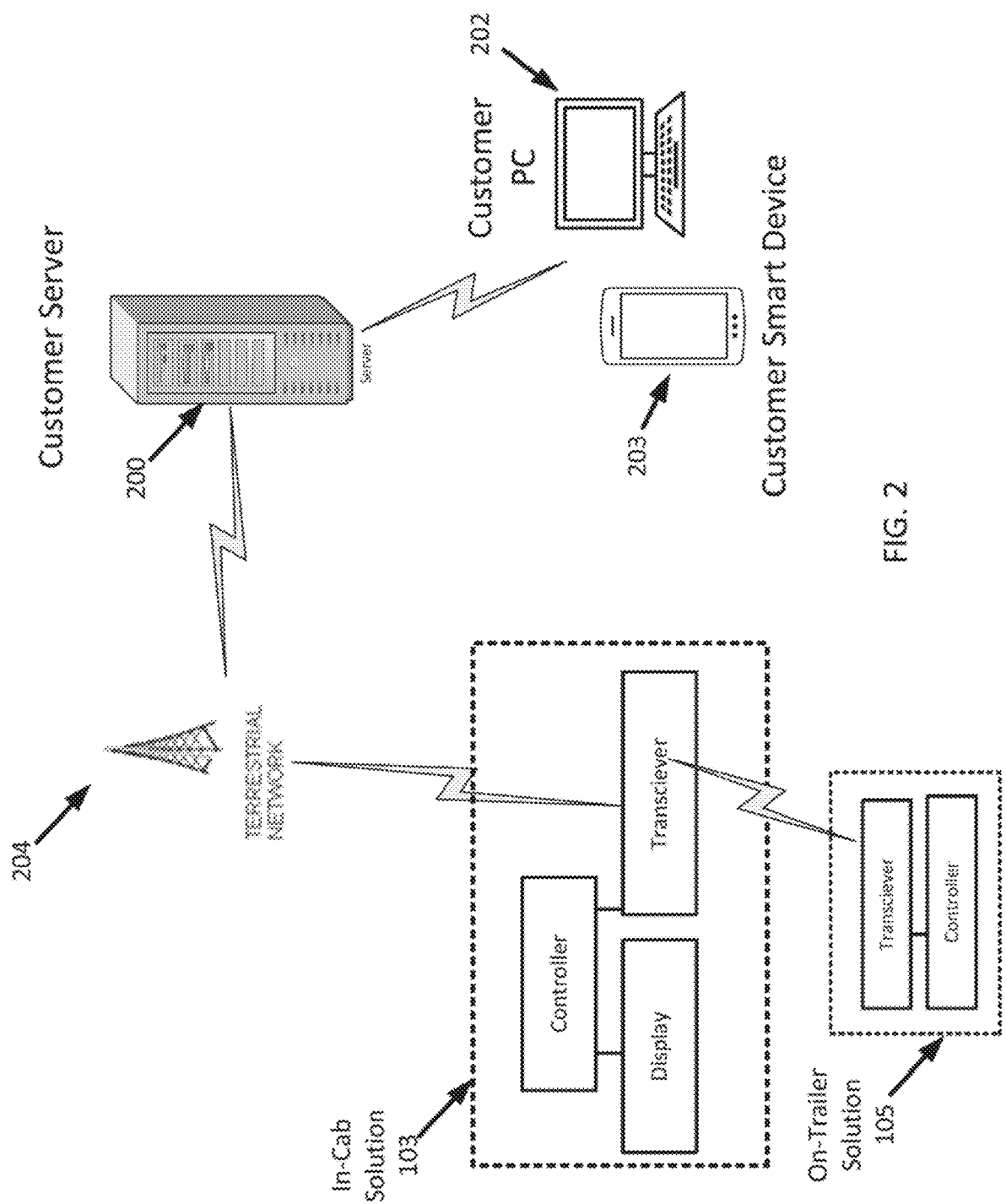
FIG. 2 shows a block diagram of the tractor-trailer ID system, according to an aspect of the disclosure.

FIG. 2 shows a block diagram of the overall trailer ID system that includes in-cab solution 103, on-trailer solution 105, trailer ID server 200, customer personal computer (PC) 202, and/or customer smart device 203. The operational examples of the system in FIGS. 3-5 will now be described with respect to FIG. 2.

Figure 3:
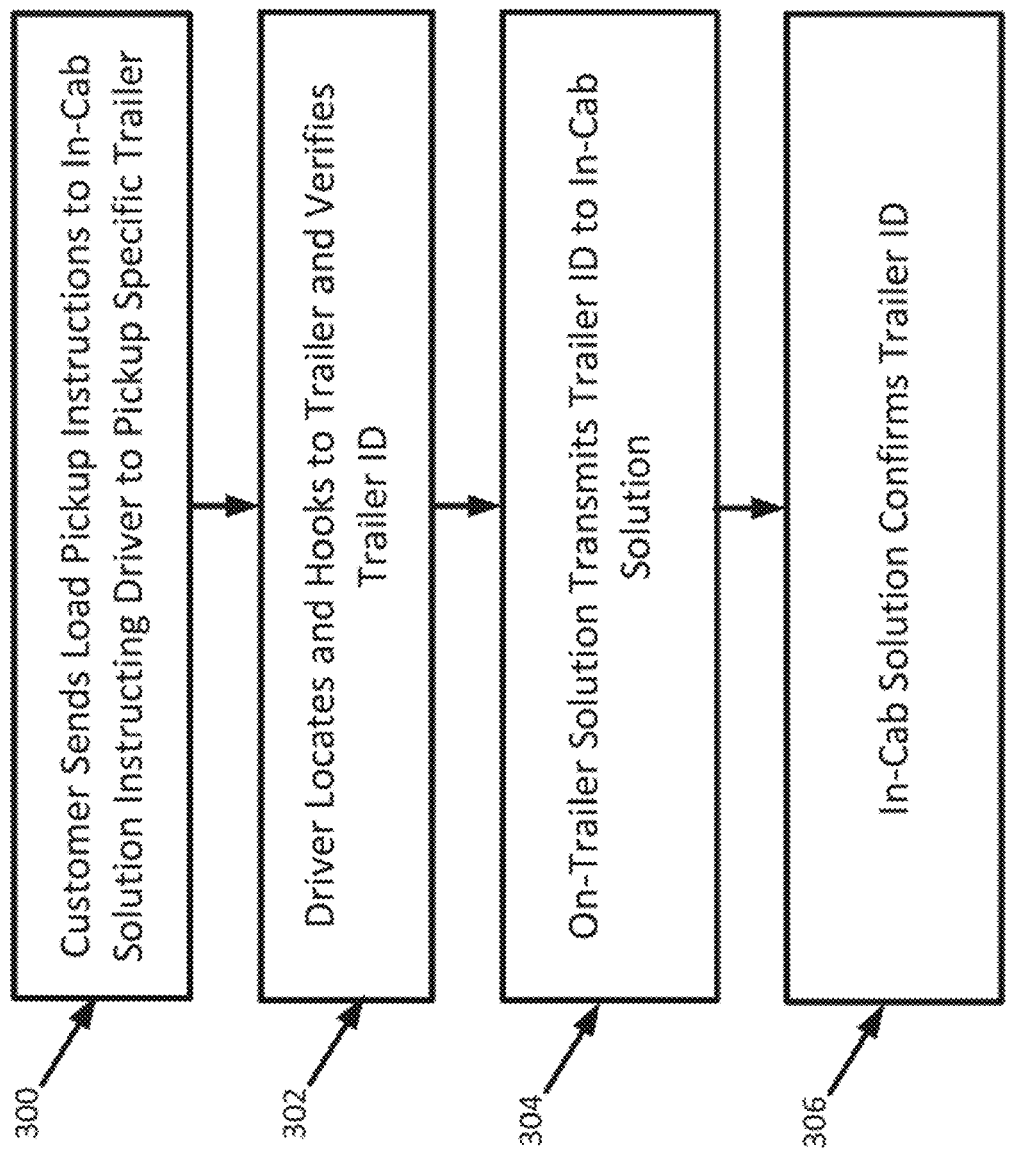
FIG. 3 shows a flowchart of the operation of the tractor-trailer ID system, according to an aspect of the disclosure.

In a first operational example, shown in FIG. 3, the customer (e.g. shipper) PC 202 sends load pickup instructions to in-cab solution 103 via server 200 and terrestrial network 204 (STEP 300). The pickup instructions are displayed on a display screen of in-cab device 103 and include the trailer ID number that the driver is asked to locate and hook to at a terminal facility, trailer yard, shipper facility, consignee facility, or an exchange facility (truck stop or other location). The driver then locates and hooks to the specific trailer and verifies the action on the in-cab workflow application prior to leaving the facility (STEP 302). On-trailer solution 105 then begins to transmit the trailer ID to in-cab solution 103 (STEP 304). This transmission may be triggered by the in-cab-solution upon detecting hookup of the trailer to the tractor, by detecting motion of the trailer (e.g., for a predetermined period of time or at a predetermined speed), by automated signal from a remote location (e.g. server 200 or PC 202) upon receipt of verification from the driver, or based on another predetermined event. Such transmission should begin within a predetermined period of time from the triggering event, e.g., within five minutes, or preferably within one minute, or more preferably within 30 seconds, or more preferably within 15 seconds, or more preferably within 10 seconds, in order to identify mismatches as promptly as possible.

Upon receiving the transmitted trailer ID, in-cab solution 103 confirms the trailer ID by comparing it to the trailer ID in the pickup instructions. This comparison and matching procedure may be repeated as the tractor-trailer leaves the pickup location to ensure that the received trailer ID is actually being transmitted from the trailer that is hooked to the tractor, and not from a nearby trailer in the shipping yard. If a match is determined, then a match confirmation may be displayed to the driver and also sent to the customer (e.g. shipper). If a mismatch is determined, then a mismatch alert may be displayed to the driver and sent to the customer (e.g. shipper).

Figure 4:
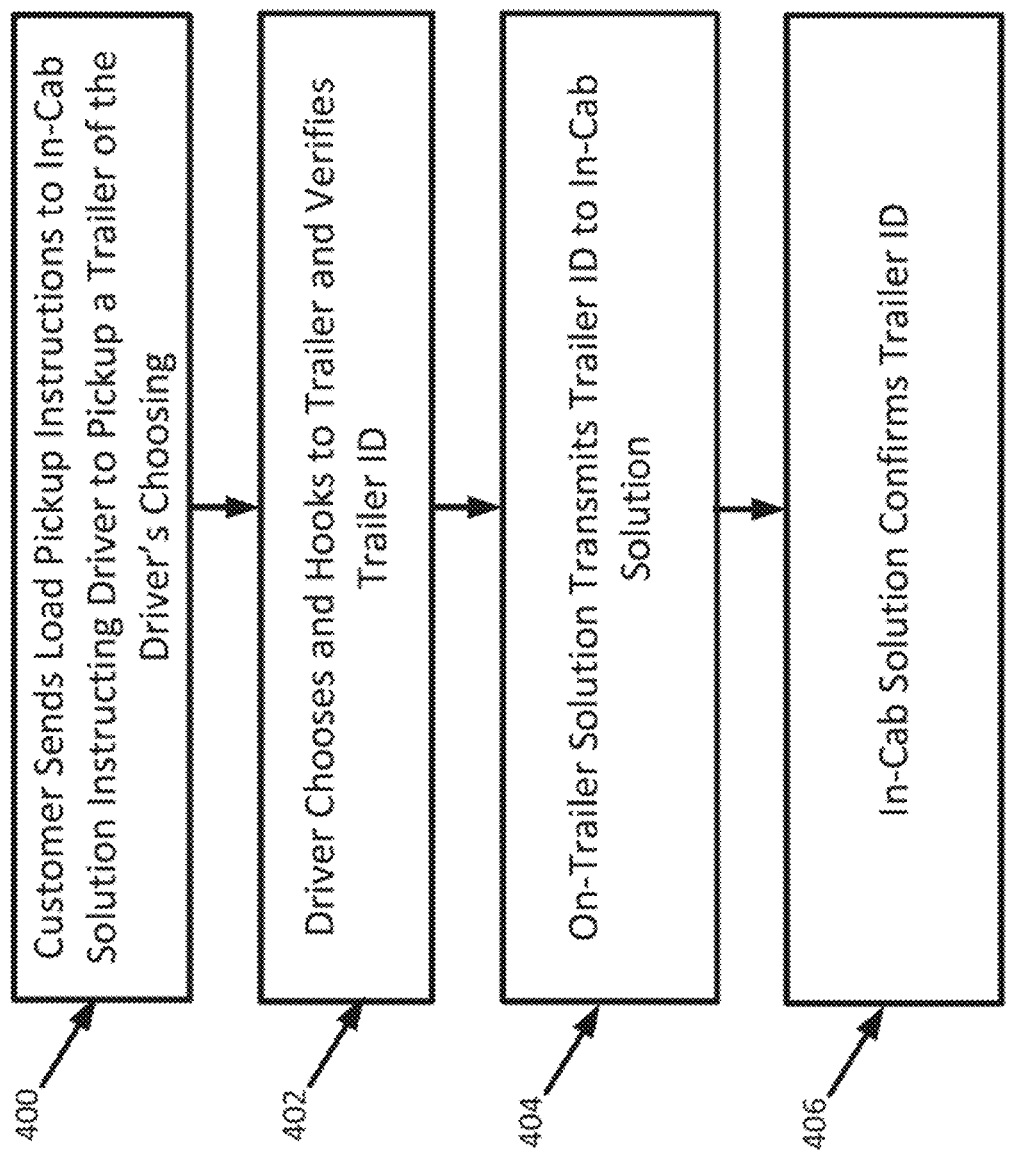
FIG. 4 shows another flowchart of the operation of the tractor-trailer ID system, according to an aspect of the disclosure.

In a second operational example, shown in FIG. 4, the customer (e.g. shipper) PC 202 sends load pickup instructions to in-cab solution 103 via server 200 and terrestrial network 204 (STEP 400). The pickup instructions are displayed on in-cab device 103 and include instructions for the driver to hook to a trailer of their choosing at the terminal facility, trailer yard, shipper facility, consignee facility, or an exchange facility (truck stop or other location). The driver then locates and hooks to a trailer of their choosing and verifies the action (e.g. enters the trailer ID) on the in-cab workflow application prior to leaving the facility (STEP 402). On-trailer solution 105 then begins to transmit the trailer ID to in-cab solution 103 (STEP 404). Again, this transmission may be triggered based on any of the events identified above. Upon receiving the transmitted trailer ID, in-cab solution 103 confirms the trailer ID by comparing it to the trailer ID entered by the driver. This comparison and matching procedure may be repeated as the tractor-trailer leaves the pickup location to ensure that the received trailer ID is actually being transmitted from the trailer that is hooked to the tractor, and not from a nearby trailer in the shipping yard. Again, if a match is determined, then a match confirmation may be displayed to the driver and sent to the customer (e.g. shipper). Likewise, if a mismatch is determined, then a mismatch alert may be displayed to the driver and sent to the customer (e.g. shipper).

Figure 5:
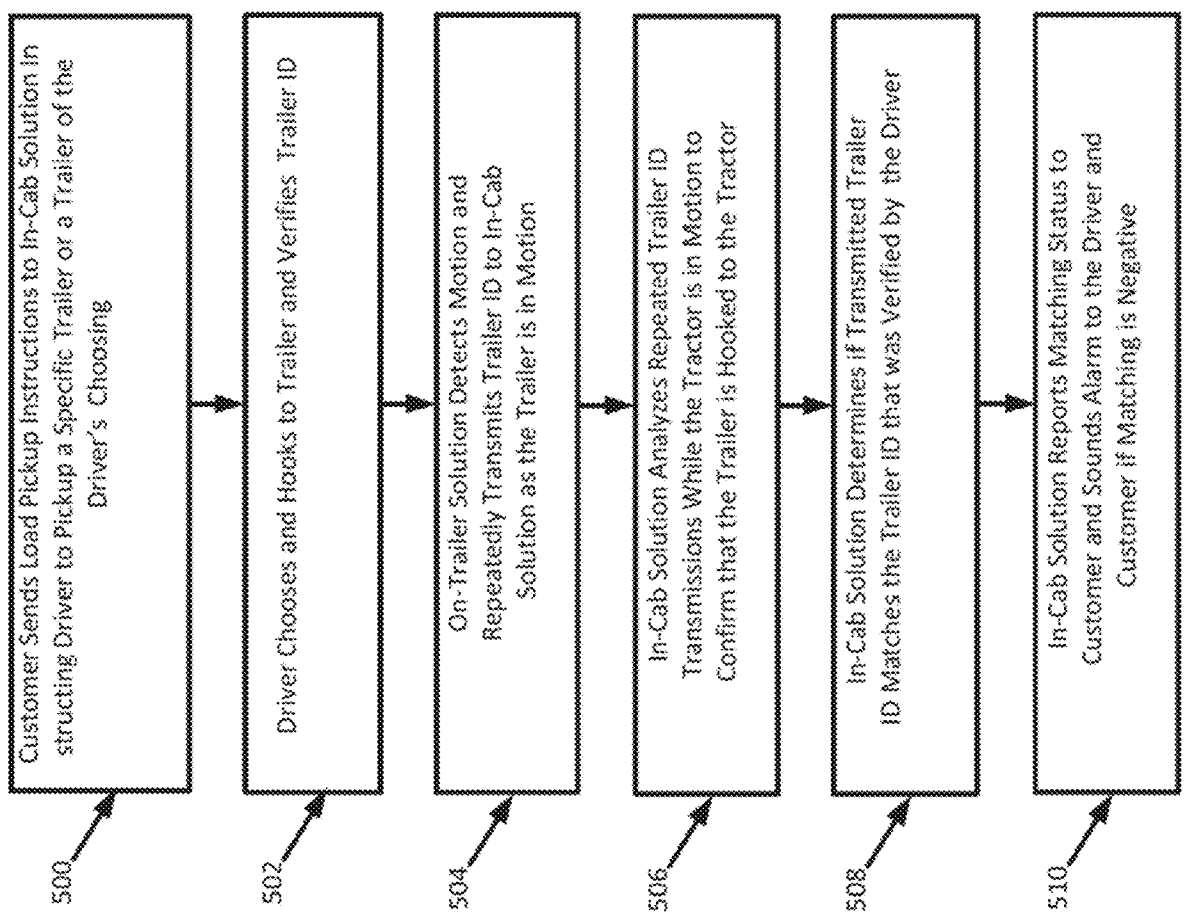
FIG. 5 shows another flowchart of the operation of the tractor-trailer ID system, according to an aspect of the disclosure.

An overall operational example is shown in FIG. 5, where the customer (e.g. shipper) PC 202 sends load pickup instructions to in-cab solution 103 via server 200 and terrestrial network 204 (STEP 500). The pickup instructions are displayed on in-cab device 103 and include either the trailer ID number that the driver is asked to locate and hook to, or instructions for the driver to hook to a trailer of their choosing at the terminal facility, trailer yard, shipper facility, consignee facility, or an exchange facility (truck stop or other location). The driver then locates and hooks to a trailer and verifies the action (e.g. enters the trailer ID) on the in-cab workflow application prior to leaving the facility (STEP 502). On-trailer solution 105 then begins to repeatedly transmit the trailer ID to in-cab solution 103, e.g., when trailer motion is detected (STEP 504). Upon receiving the transmitted trailer ID, in-cab solution 103 analyzes the trailer ID by comparing it to the trailer ID entered by the driver (STEP 506) and determines if a match occurs (STEP 508). In-cab solution 103 then reports the matching status to the driver and the customer (e.g. shipper) (STEP 510).

In addition to using the trailer ID, the VTID may use measurable signal parameters from the transmission of the trailer ID or any transmitted signal in order to aid the driver in locating the matching trailer in the pickup location (e.g. shipping yard) and to more accurately confirm that the proper trailer has been hooked up. These measurable signal parameters include but are not limited to received signal strength (RSSI) and round-trip-timing (RTT) of a ping sent between the in-cab solution and the on-trailer solution. For example, as the driver navigates the tractor through the pickup location (e.g. shipping yard), the in-cab solution may send a request to nearby on-trailer solutions to send their ID. When a matching ID is detected, the in-cab solution may use RSSI and/or RTT to locate the matching trailer among the numerous trailers that are in the vicinity (e.g. instruct the driver to travel in the direction that results in an increased RSSI or a decreased RTT until the matching trailer is located).

As set forth above, transmission of the trailer ID to the in-cab solution may be done by wire, e.g. through existing electrical communication connectors between the tractor and the trailer, or one or more different means of wireless communication described herein. When identification of a trailer ID by the in-cab solution is made initially by wireless communication, the system may preferably rely on existing electrical communications between trailer and tractor to confirm the identification, e.g., at a subsequent time and/or within a predetermined period of time.

The VTID may also be extended to include a mechanism for ensuring that the tractor parks the trailer at the correct dock at a loading/unloading facility that may include many candidate docks. For example, when the tractor is hauling an empty trailer to be loaded, or is hauling a loaded trailer to be unloaded, it may be important to park the trailer at a specific dock of the many candidate docks. Rather than relying solely on the driver's decision, each dock may be fitted with an on-dock solution (not shown) that is similar in structure and functionality to on-trailer solution 105. The driver may receive instructions via the in-cab solution to park a particular trailer (e.g. trailer number) at a particular dock (e.g. dock number). Upon parking the particular trailer at the particular dock, the on-dock solution would transmit its Bluetooth ID to the on-trailer solution and/or to the in-cab solution. The on-trailer solution and/or the in-cab solution would then compare the received Bluetooth ID to the dock number and trailer number received in the instructions. If a match is determined, then a match confirmation may be displayed to the driver via the in-cab solution and sent to the loading facility manager. If a mismatch is determined, then a mismatch alert may be displayed to the driver via the in-cab solution and sent to the loading facility manager. This ensures that the correct trailer is parked at the correct dock.

Although container 100 is shown in FIG. 1 as a trailer for a truck, it is noted that container 100 could be a container on any vehicle such as a train, a plane, a ship, or the like. Therefore, the VTID system described above could also be used in these examples (e.g. to match a container to its transportation means).

In addition, transportation is not the only application for this VTID solution. In one example, the in-cab solution could be an on-person solution embodied by a smartphone or other device carried or worn by the user, while the on-trailer solution could be an in-location solution installed in a room within a building. The smartphone user (student, worker, etc.) may receive instructions to go to a particular room in a building (e.g. school, office building, hospital, etc.). Upon entering the room, the on-trailer solution would transmit the Bluetooth ID to the smartphone. The smartphone would then compare the received BLE ID to the room number received in the instructions. If a match is determined, then a match confirmation may be displayed to the smartphone user and sent to the customer (e.g. school administrator, company management, hospital management, etc.). If a mismatch is determined, then a mismatch alert may be displayed to the smartphone user and sent to the customer. Needless to say, the trailer ID system could also be implemented for any two or more items (e.g. objects, persons, etc.) that should be matched together in the same location.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

In the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in fewer than all features of a single disclosed embodiment. Thus the following claims are hereby incorporated into the Detailed Description, with each claim standing on its own as a separately claimed subject matter.

What is claimed is:

1. A tractor-trailer ID system comprising:
    a tractor device in a tractor, the tractor device including:
        a tractor transceiver,
        a tractor display, and
        a tractor controller; and
    a trailer device in the trailer, the trailer device including:
        a trailer transceiver, and
        a trailer controller,
    wherein tractor-trailer ID system is configured to:
        display, via the tractor display, load pickup instructions to a driver of the tractor,
        determine that the trailer has been connected to the tractor,
        after determining that the trailer is connected to the tractor, transmit, from the trailer transceiver to the tractor transceiver, a trailer ID,
        confirm, via the tractor controller, the trailer ID, and
    wherein the load pickup instructions do not include the trailer ID and the tractor-trailer ID system is further configured to confirm the trailer ID by transmitting, via the tractor transceiver, the trailer ID to a shipping server, and
    wherein the tractor device is configured to (i) transmit, via the tractor transceiver, a ping to the trailer device; (ii) receive, via the tractor transceiver, the ping in return from the trailer transceiver; (iii) compute, with the tractor controller, a roundtrip travel time of the ping; and (iv) confirm that the tractor is connected to the trailer based on the roundtrip travel time.

2. The tractor-trailer ID system of claim 1,
wherein the load pickup instructions include the trailer ID and the tractor-trailer ID system is further configured to confirm the trailer ID by confirming that the trailer ID in the load pickup instructions matches the trailer ID received from the trailer transceiver.

3. A tractor-trailer ID system comprising:
a tractor device in a tractor, the tractor device including:
    a tractor transceiver,
    a tractor display, and
    a tractor controller; and
a trailer device in the trailer, the trailer device including:
    a trailer transceiver, and
    a trailer controller,
wherein tractor-trailer ID system is configured to:
    display, via the tractor display, load pickup instructions to a driver of the tractor,
    determine that the trailer has been connected to the tractor,
    after determining that the trailer is connected to the tractor, transmit, from the trailer transceiver to the tractor transceiver, a trailer ID,
    confirm, via the tractor controller, the trailer ID, and
wherein the load pickup instructions do not include the trailer ID and the tractor-device further includes a tractor input device to receive an input trailer ID,
wherein the tractor-trailer ID system is further configured to confirm the trailer ID by comparing the trailer ID from the trailer device to the input trailer ID, and
wherein the tractor device is configured to (i) transmit, via the tractor transceiver, a ping to the trailer device; (ii) receive, via the tractor transceiver, the ping in return from the trailer transceiver; (iii) compute, with the tractor controller, a roundtrip travel time of the ping; and (iv) confirm that the tractor is connected to the trailer based on the roundtrip travel time.

4. The tractor-trailer ID system of claim 1,
wherein tractor-trailer ID system is further configured to detect motion of the trailer, and to transmit, from the trailer transceiver to the tractor transceiver, the trailer ID within a predetermined period of time from detecting motion of the trailer.

5. The tractor-trailer ID system of claim 1,
wherein tractor-trailer ID system is further configured to repeatedly at predetermined intervals of time:
    transmit, from the trailer transceiver to the tractor transceiver, the trailer ID, and
    confirm, via the tractor controller, the trailer ID.

6. The tractor-trailer ID system of claim 1,
wherein tractor-trailer ID system is further configured to alert the driver, via the tractor display, when the trailer ID is confirmed to be incorrect.

7. The tractor-trailer ID system of claim 1,
wherein prior to the trailer being connected to the tractor, the tractor-trailer ID system is further configured to:
    transmit, from the trailer transceiver to the tractor transceiver, the trailer ID,
    upon reception of the trailer ID, detect, via the tractor controller, that the tractor is in proximity to the trailer, and
    alert the driver, via the tractor display, that the tractor is in proximity to the trailer.

8. The tractor-trailer ID system of claim 1,
wherein the tractor device is one of an in-cab infotainment system or a mobile smart device.

9. The tractor-trailer ID system of claim 1,
wherein the tractor transceiver and the trailer transceiver execute a data packet communication protocol, and the trailer ID is transmitted from the trailer transceiver to the tractor transceiver via a broadcasting packet in the data packet communication protocol.

10. An asset ID system comprising:
a transportation device attached to a transportation means, the transportation device including:
    a transportation transceiver,
    a transportation display, and
    a transportation controller; and
an asset device attached to an asset, the asset device including:
    an asset transceiver, and
    an asset controller,
wherein the asset ID system is configured to:
    display, via the transportation display, load pickup instructions to loading personnel of the transportation means,
    after the asset is loaded on or connected to the transportation means, transmit, from the asset transceiver to the transportation transceiver, an asset ID,
    confirm, via the transportation controller, the asset ID, and
wherein the load pickup instructions do not include the asset ID and the asset ID system is further configured to confirm the asset ID by transmitting, via the transportation transceiver, the asset ID to a server, and
wherein the transportation device is configured to (i) transmit, via the transportation transceiver, a ping to the assert device; (ii) receive, via the transportation transceiver, the ping in return from the asset transceiver; (iii) compute, with the transportation controller, a roundtrip travel time of the ping; and (iv) confirm that the asset is loaded on or connected to the transportation means based on the roundtrip travel time.

11. The tractor-trailer ID system of claim 3,
wherein the load pickup instructions include the trailer ID and the tractor-trailer ID system is further configured to confirm the trailer ID by confirming that the trailer ID in the load pickup instructions matches the trailer ID received from the trailer transceiver.

12. The tractor-trailer ID system of claim 3,
wherein tractor-trailer ID system is further configured to detect motion of the trailer, and to transmit, from the trailer transceiver to the tractor transceiver, the trailer ID within a predetermined period of time from detecting motion of the trailer.

13. The tractor-trailer ID system of claim 3,
wherein tractor-trailer ID system is further configured to repeatedly at predetermined intervals of time:
    transmit, from the trailer transceiver to the tractor transceiver, the trailer ID, and
    confirm, via the tractor controller, the trailer ID.

14. The tractor-trailer ID system of claim 3,
wherein tractor-trailer ID system is further configured to alert the driver, via the tractor display, when the trailer ID is confirmed to be incorrect.

15. The tractor-trailer ID system of claim 3,
wherein prior to the trailer being connected to the tractor, the tractor-trailer ID system is further configured to:
    transmit, from the trailer transceiver to the tractor transceiver, the trailer ID, upon reception of the trailer ID, detect, via the tractor controller, that the tractor is in proximity to the trailer, and alert the driver, via the tractor display, that the tractor is in proximity to the trailer.

16. The tractor-trailer ID system of claim 3, wherein the tractor device is one of an in-cab infotainment system or a mobile smart device.

17. The tractor-trailer ID system of claim 3, wherein the tractor transceiver and the trailer transceiver execute a data packet communication protocol, and the trailer ID is transmitted from the trailer transceiver to the tractor transceiver via a broadcasting packet in the data packet communication protocol.

* * * * *